United States Patent
Xie et al.

(10) Patent No.: US 8,325,140 B2
(45) Date of Patent: Dec. 4, 2012

(54) ILLUMINATION SPOT ALIGNMENT

(75) Inventors: Tong Xie, San Jose, CA (US); Michael Brosnan, Fremont, CA (US); Tiong Heng Siah, Joor (MY); Tong Sen Liew, Perak (MY); Lye Hock Bernard Chan, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 2721 days.

(21) Appl. No.: 10/827,864

(22) Filed: Apr. 20, 2004

(65) Prior Publication Data

US 2005/0231479 A1  Oct. 20, 2005

(51) Int. Cl.
G06F 3/033 (2006.01)
(52) U.S. Cl. ........................................................ 345/166
(58) Field of Classification Search .................. 345/156, 345/163–167, 175–176; 250/208.1, 208.2, 250/208.5, 221; 362/555, 27; 353/98; 359/496; 382/312
See application file for complete search history.

(56) References Cited

U.S. PATENT DOCUMENTS

| | | | |
|---|---|---|---|
| 5,574,480 A * | 11/1996 | Pranger et al. | 345/166 |
| 5,578,813 A | 11/1996 | Allen et al. | |
| 5,589,880 A | 12/1996 | Tsukui | |
| 5,644,139 A | 7/1997 | Allen et al. | |
| 5,786,804 A | 7/1998 | Gordon | |
| 6,256,016 B1 | 7/2001 | Piot et al. | |
| 6,281,882 B1 | 8/2001 | Gordon et al. | |
| 6,433,780 B1 * | 8/2002 | Gordon et al. | 345/166 |
| 6,462,860 B1 | 10/2002 | Ionov | |
| 7,086,768 B2 * | 8/2006 | Suwa et al. | 362/555 |
| 7,122,781 B2 * | 10/2006 | Rotzoll et al. | 250/221 |
| 2005/0168445 A1 * | 8/2005 | Piot et al. | 345/163 |

FOREIGN PATENT DOCUMENTS

| | | |
|---|---|---|
| TW | 509867 | 11/2002 |
| TW | 573765 | 1/2004 |
| WO | WO-03/049018 | 6/2003 |

* cited by examiner

Primary Examiner — Abbas Abdulselam

(57) ABSTRACT

Illumination spot alignment is performed by capturing an image by an image array. The image is evaluated to determine an illumination spot size and location. Coordinates identifying the illumination spot size and location are stored.

14 Claims, 4 Drawing Sheets

ILLUMINATION SPOT ALIGNMENT

BACKGROUND

In one type of optical mouse, the optical mouse uses photodetectors arranged as an image array of pixels to image the spatial features of generally any micro textured or micro detailed work surface located below the optical mouse. Photodetector responses are digitized and stored as a frame into memory. Motion produces successive frames of translated patterns of pixel information. The successive frames are compared by cross-correlation to ascertain the direction and amount of movement. For more information on this type of optical mouse, see, for example, U.S. Pat. No. 6,281,882 B1.

The imaging and performance tracking required by optical mice, and similar pointing devices that require optical navigation sensing, rely heavily on uniform illumination across the array of pixels. Uniform illumination is obtained by careful alignment of the array of pixels, an illuminator and accompanying optics. Such careful alignment can be expensive from a manufacturing point of view.

SUMMARY OF THE INVENTION

In accordance with an embodiment of the present invention, illumination spot alignment is performed by capturing an image by an image array. The image is evaluated to determine an illumination spot size and location. Coordinates identifying the illumination spot size and location are stored.

DESCRIPTION OF THE EMBODIMENT

Figure 1:
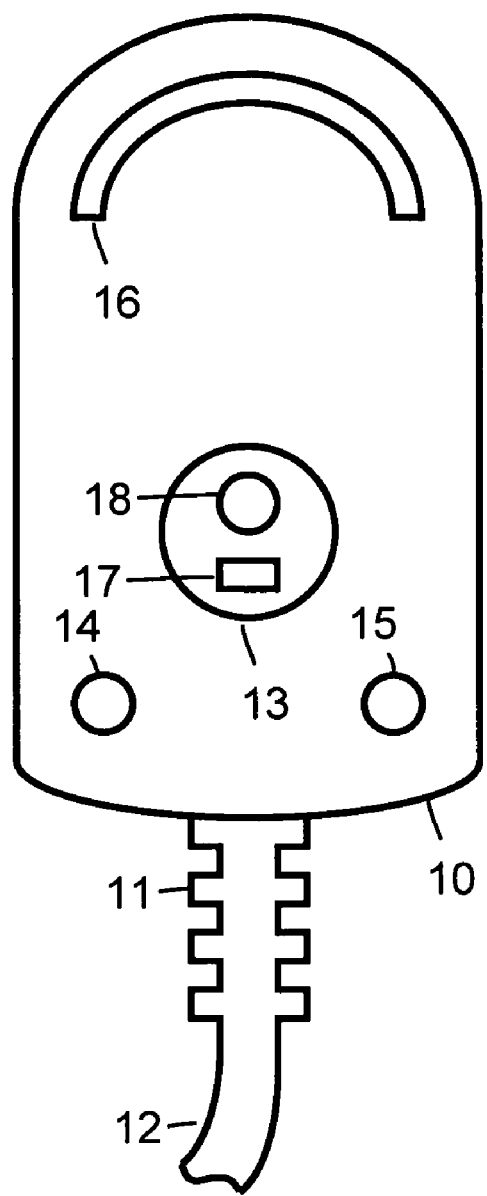
FIG. 1 is a simplified view of the underside of a pointing device.

FIG. 1 is a simplified view of the underside of a pointing device 10. For example, pointing device 10 is an optical mouse. A low friction guide 14, a low friction guide 15 and a low friction guide 16 are used by pointing device 10 to make contact with an underlying surface. A connecting cable 12 and strain relief 11 are also shown. Alternatively, pointing device 10 can be a wireless mouse and connecting cable 12 can be omitted.

Within an orifice 13 is shown an illuminator 17 and an image array 18. For example, various optics, as necessary or desirable, are included within illuminator 17 and/or image array 18. For example, illuminator 17 is implemented using a light emitting diode (LED), an infrared (IR) LED, or a laser.

Figure 2:
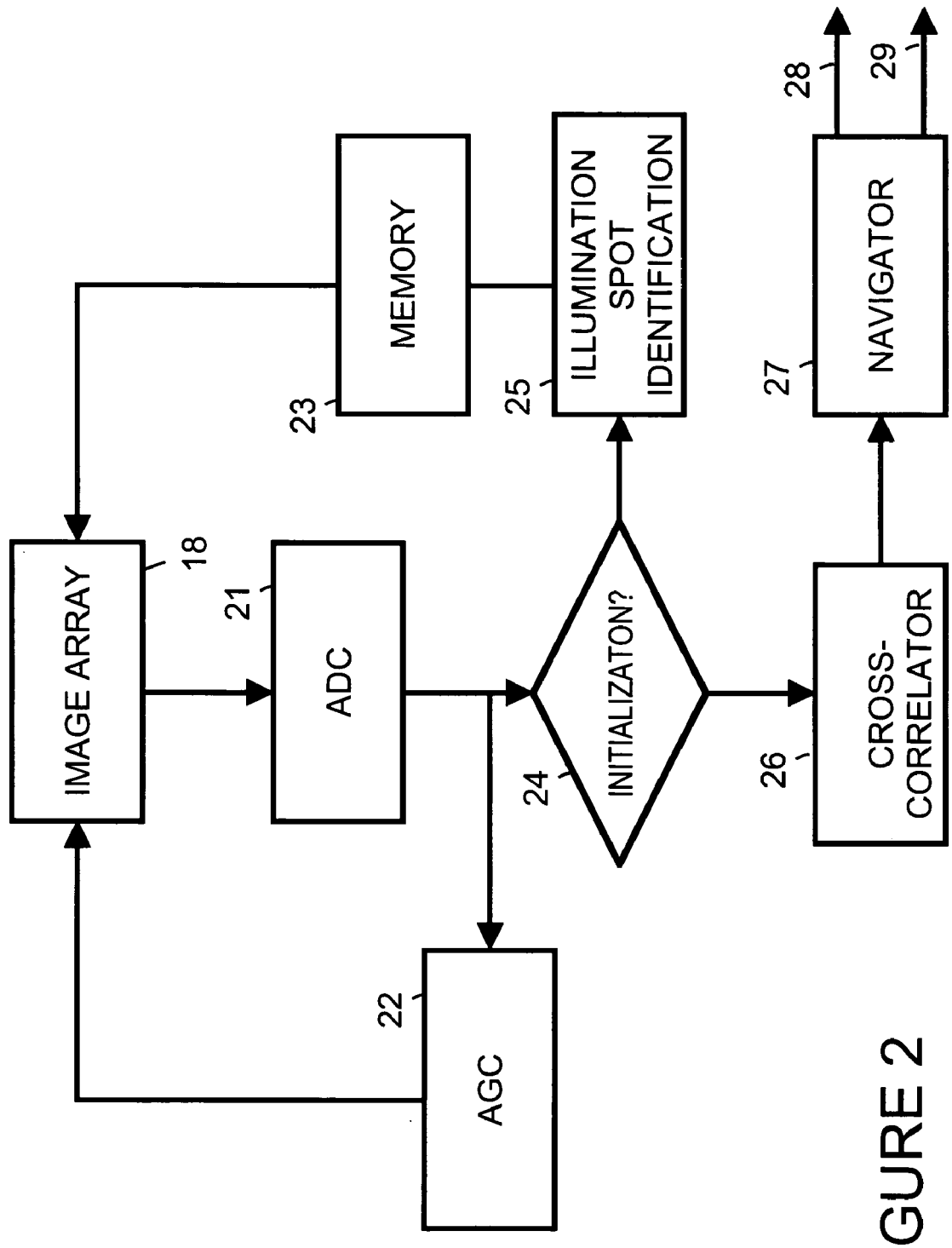
FIG. 2 is a simplified block diagram of an optical navigation sensing system in accordance with an embodiment of the present invention.

FIG. 2 is a simplified block diagram of an optical navigation sensing system. Image array 18 is implemented, for example, using a 32 by 32 array of photodetectors. Alternatively, other array sizes can be used.

An analog-to-digital converter (ADC) 21 receives analog signals from image array 18 and converts the signals to digital data. For example, the interface between image array 18 and ADC 21 is a serial interface. Alternatively, the interface between image array 18 and ADC 21 is a parallel interface.

An automatic gain control (AGC) 22 evaluates digital data received from ADC 21 and controls shutter speed and gain adjust within image array 18. This is done, for example, to prevent saturation or underexposure of images captured by image array 18.

A cross-correlator 26 evaluates the digital data from ADC 21 and performs a convolution to calculate overlap of images and to determine peak shift between images in order to detect motion. A navigator 27 takes results from cross-correlator 26 to determine a delta x value placed on an output 28 and to determine a delta y value placed on an output 29.

Existing optical mice include functionality identical or similar to image array 18, ADC 21, AGC 22, cross-correlator 26 and navigator 27. For further information on how this standard functionality or similar functionality of optical mice are implemented, see, for example, U.S. Pat. No. 5,644,139, U.S. Pat. No. 5,578,813, U.S. Pat. No. 5,786,804 and/or U.S. Pat. No. 6,281,882 B1.

An initialization block 24 checks to see whether pointing device 10 is in the illumination spot identification mode. For example, pointing device 10 is placed in the illumination spot identification mode by toggling a switch within pointing device 10. For example, the switch is not accessible to an end user of pointing device 10. When pointing device 10 is not in the illumination spot identification mode, digital data from ADC 21 is forwarded directly to cross-correlator 26 and pointing device 10 proceeds in a normal mode to track movement. During normal operation (e.g., not in an illumination spot identification mode) of pointing device 10, only pixels of image array 18 that are within a bounding box determined by data within a memory 23 are forwarded to ADC 21 and used for movement/position tracking.

When pointing device 10 is in the illumination spot identification mode, digital data from ADC 21 is intercepted and sent to an illumination spot identification block 25. Data from all pixels within image array 18 are used when pointing device 10 is in the illumination spot identification mode. Illumination spot identification block 25 performs illumination spot alignment using the received data.

For example, illumination spot identification block 25 finds a location of the peak illumination intensity of light detected by image array 18. Illumination spot identification block 25 then determines a boundary where a predetermined percentage of peak illumination intensity occurs. For example the predetermined percentage is 50%. Alternatively, the predetermined percentage varies depending upon the components used to implement optical pointing device 10 and/or upon the desired resolution.

On the basis of the location of the detected peak illumination intensity and boundary, coordinates for a bounding box are determined. The coordinates for the bounding box are stored within memory 23. For example, stored coordinates can be in the form of x, y coordinates for two corners of the bounding box (e.g., the lower left hand corner of the bounding box, and the upper right hand corner of the bounding box). Alternatively, the stored coordinates can be in the form of a single x, y coordinate (e.g., for the lower left hand corner of the box, the upper right corner of the box, or the center of the box, etc.), and an x length and a y length of the bounding box. Alternatively, the coordinates can be any type of coordinates that define the bounding box.

Figure 3:
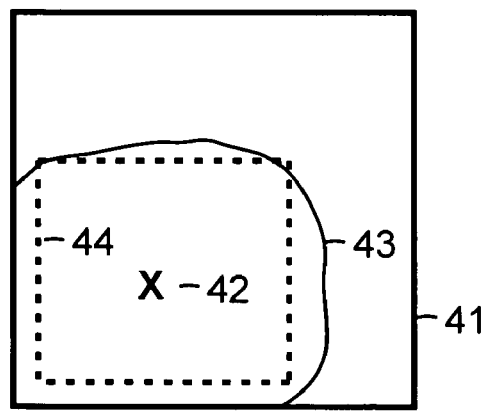
FIG. 3 illustrates illumination spot alignment calibration in accordance with an embodiment of the present invention.
Figure 3:
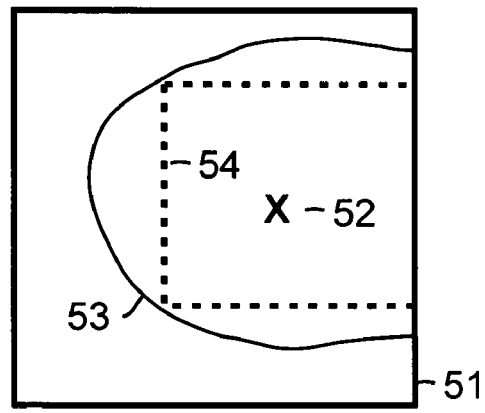
Figure 3:
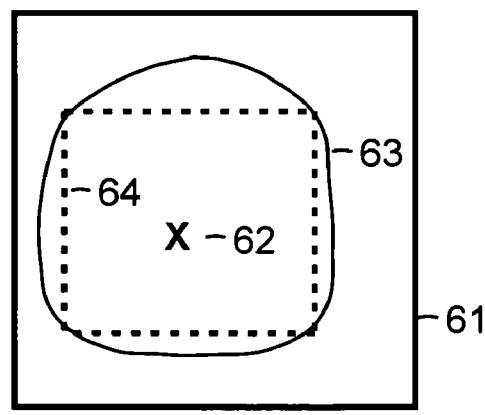

FIG. 3 variously illustrates the illumination spot alignment performed by illumination spot identification block 25. Array area 41 represents the full area covered by all the pixels of image array 18. Illumination spot identification block 25 locates a peak illumination intensity 42 and a boundary 43 where a predetermined percentage of peak illumination intensity occurs. From detected peak illumination intensity 42 and boundary 43, illumination spot identification block 25 generates coordinates for a bounding box 44. Bounding box 44 includes only a subset of pixels of image array 18.

Likewise, array area 51 represents the full area covered by all the pixels of image array 18. Illumination spot identification block 25 locates a peak illumination intensity 52 and a boundary 53 where a predetermined percentage of peak illumination intensity occurs. From detected peak illumination intensity 52 and boundary 53, illumination spot identification generates coordinates for a bounding box 54. Bounding box 54 includes only a subset of pixels of image array 18.

Likewise, array area 61 represents the full area covered by all the pixels of image array 18. Illumination spot identification block 25 locates a peak illumination intensity 62 and a boundary 63 where a predetermined percentage of peak illumination intensity occurs. From detected peak illumination intensity 62 and boundary 63, illumination spot identification generates coordinates for a bounding box 64. Bounding box 64 includes only a subset of pixels of image array 18.

Figure 4:
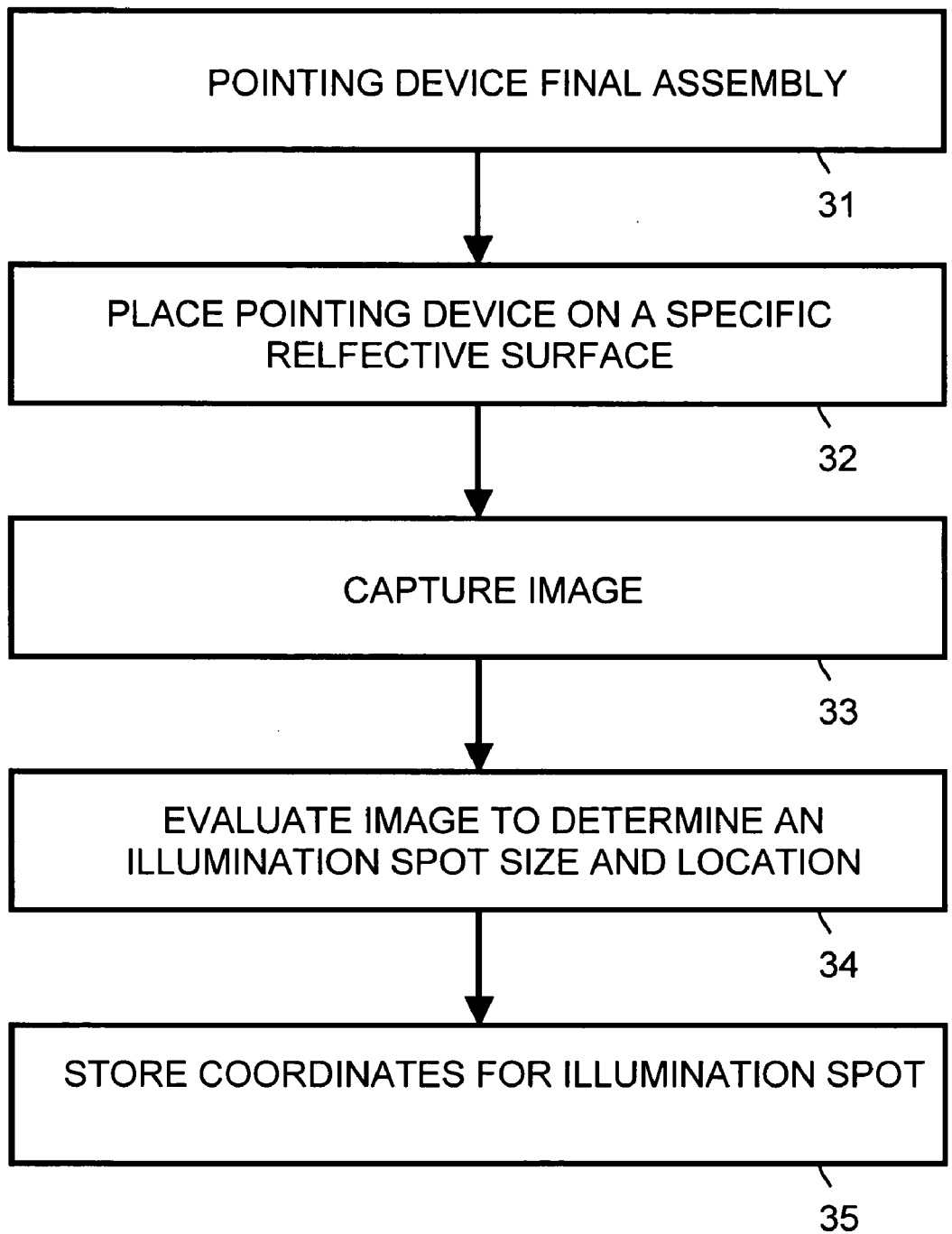
FIG. 4 is a simplified flowchart illustrating illumination spot alignment in accordance with an embodiment of the present invention.

FIG. 4 is a simplified flowchart illustrating illumination spot alignment within a manufacturing process. In a block 31, final assembly of a pointing device, such as an optical mouse, is performed. In a block 32, the pointing device is placed on a reflective surface specifically used for the performance of illumination spot alignment. The use of such a specific reflective surface ensures uniformity in initialization results.

In a block 33, the pointing device captures an image while within an illumination spot identification mode. The captured image is captured using all the pixels within the image array.

In a block 34, the pointing device evaluates the image to determine an illumination spot size and location. For example, the pointing device locates a peak illumination intensity and a boundary where a predetermined percentage of peak illumination intensity occurs. This allows calculation of illumination spot size and center. In a block 35, coordinates for spot size are stored in memory for use by the image array.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A pointing device, comprising:
an image array;
initialization selector that selects a data path for data from the image array; and,
an illumination spot identifier that receives the data from the image array when the pointing device is in a special mode, the illumination spot identifier identifying a subset of the image array as being within an illumination spot.

2. A pointing device as in claim 1 wherein the image array comprises a matrix of photodetectors.

3. A pointing device as in claim 1 additionally comprising:
an illuminator that emits light which when reflected from a surface is detected by the image array.

4. A pointing device as in claim 1 wherein the subset of the image array is a subsection of the image array.

5. A pointing device as in claim 1, additionally comprising a motion detector that receives the data from the image array when the pointing device is not in a special mode.

6. A pointing device as in claim 1 additionally comprising:
a memory in which is stored coordinates corresponding to the subset of the image array identified by the illumination spot identifier as being within the illumination spot.

7. A pointing device as in claim 1:
wherein the image array comprises a plurality of pixels;
wherein the subset of the image array comprises a subset of the plurality of pixels;
wherein when the pointing device is in the special mode, data is received from all of the plurality of pixels in the image array; and,
wherein when the pointing device is not in the special mode, data is received only from the subset of the plurality of pixels.

8. A pointing device, comprising:
array means for producing an array of output signals that represent detected illuminance;
selection means for selecting a data path for data from the array means; and,
identification means for receiving the data from the array means when the pointing device is in a special mode, and for identifying a subset of the output signals as being within an illumination spot.

9. A pointing device as in claim 8 wherein the array means comprises a matrix of photodetectors.

10. A pointing device as in claim 8 additionally comprising:
illumination means for emitting light which when reflected from a surface is detected by the array means.

11. A pointing device as in claim 8 wherein the subset of the output signals are generated from a subsection of the array means.

12. A pointing device as in claim 8, additionally comprising a detector means for receiving the data from the array means when the pointing device is not in a special mode.

13. A pointing device as in claim 8 additionally comprising: memory means for storing coordinates that identify the subset of the output signals.

14. A pointing device as in claim 8:
wherein the array means comprises a plurality of pixels for producing the array of output signals;
wherein a subset of the plurality of pixels produces the subset of the output signals;
wherein when the pointing device is in the special mode, output signals are received from all of the plurality of pixels in the array means; and,
wherein when the pointing device is not in the special mode, output signals are received only from the subset of the plurality of pixels in the array means.

* * * * *